Dec. 27, 1938.  C. J. HERTLEIN  2,141,751
ADJUSTABLE WORK BED
Filed Oct. 3, 1936  2 Sheets-Sheet 1

INVENTOR
CARL J. HERTLEIN
BY Orton and Griswold
ATTORNEYS

Dec. 27, 1938.  C. J. HERTLEIN  2,141,751
ADJUSTABLE WORK BED
Filed Oct. 3, 1936  2 Sheets-Sheet 2

INVENTOR
CARL J. HERTLEIN
BY Orton and Griswold.
ATTORNEYS

Patented Dec. 27, 1938

2,141,751

UNITED STATES PATENT OFFICE 2,141,751

ADJUSTABLE WORK BED

Carl J. Hertlein, Brooklyn, N. Y., assignor of one-half to Franz Fuchs, Brooklyn, N. Y.

Application October 3, 1936, Serial No. 103,839

19 Claims. (Cl. 51—216)

The invention relates in general to an adjustable work bed for use in supporting, adjusting and feeding machine and other parts to be machined, to a grinding tool, cutter or similar operating instrument, and the invention particularly relates to an improvement in those types of work supporting beds or tables which are formed of two or more slides adjustable at right angles to each other in a horizontal plane.

The present application is a companion to application Serial No. 103,838 filed October 3, 1936 entitled "Grinding machine" in which is disclosed means for moving a grinding or like tool vertically so that the completed machine provides for relative movement between the work operated upon and the operating tool in three directions of movement each at right angles to the other.

The primary object of the invention is to provide a simplified form of adjustable work bed of the type outlined by means of which the work to be operated upon can be quickly located approximately in its desired relation to the tool and thereafter, more accurately to locate or feed the work relative to the tool through the agency of micromical and refined adjusting mechanism.

Another object of the invention is to provide a system of adjustable control stops for locating and defining permissible ranges of movement of the work when under control of the relatively coarse, or gross manipulation and which will permit of a subsequent more refined shifting of the work when so grossly located; and incidentally the invention features an organization of parts which will permit a duplication of grinding operation in the same machined areas in the machining of a number of duplicated pieces of work.

Still another object of the invention is to provide in such a work supporting bed a compact rugged arrangement of parts to minimize vibratory and similar undesired movement and at the same time to provide a construction having a relatively extensive movement in the upper, table-forming element relative to the operating tool or other point about which the work is manipulated.

Various other objects and advantages of the invention will be in part obvious from an inspection of the accompanying drawings and in part will be more fully set forth in the following particular description of one form of device embodying the invention, and the invention also consists in certain new and novel features of construction and combination of parts hereinafter set forth and claimed.

In the accompanying drawings:

Fig. 6 is an enlarged detail view showing the means for shifting the intermediate or longitudinal slide and taken on the line 6—6 of Fig. 1; and Fig. 7 is an enlarged detail view showing the means for locking the bottom slide to one of the rails and which means are also partly shown in Fig. 3.

Figure 1:
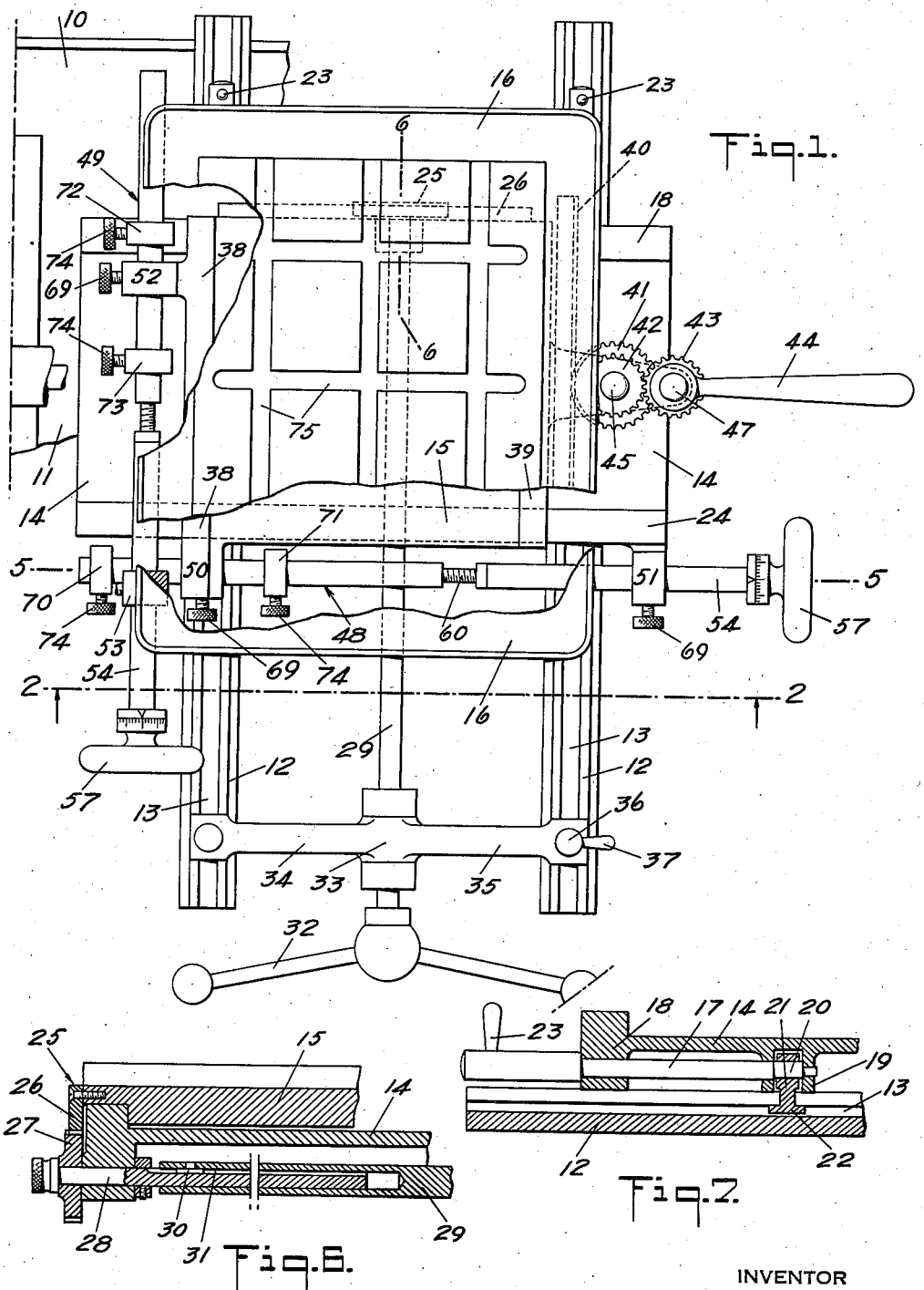
Fig. 1 is a plan view looking down upon a preferred embodiment of the invention with parts of the top slide or table broken away to show details of the control assembly and shown in its relation to the grinding machine disclosed in the above identified companion application.
Figure 2:
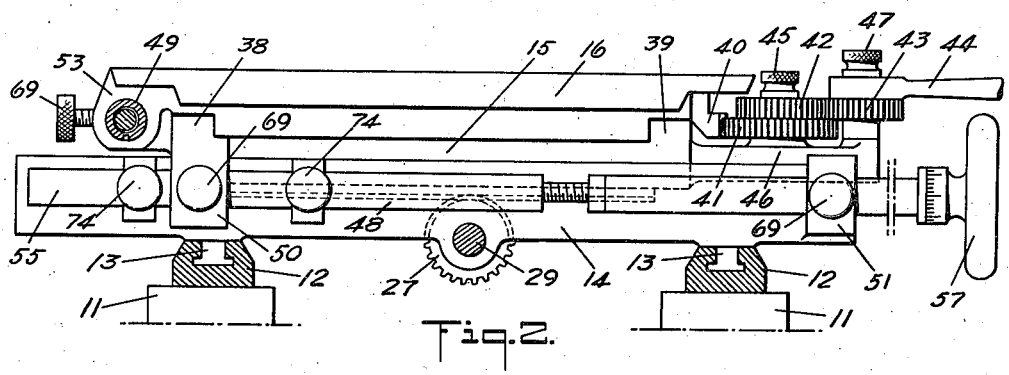
Fig. 2 is a view largely in front elevation of the structure shown in Fig. 1 and in part taken in vertical section on a plane indicated by the line 2—2 of Fig. 1 looking in the direction indicated by the arrows.

It will be understood that the complete machine of which the present disclosure forms a part includes a conventional form of support including a drip pan on which is mounted a standard and which in turn supports a grinding tool, a motor for driving the same and certain stop controls all here indicated symbolically at 10 and more fully disclosed in the above identified companion application. Referring specifically to the part of the machine for supporting and feeding the work to the grinding tool herein featured, there is disclosed herein part of the common support hereinafter referred to as a bed plate 11. Mounted on the bed plate 11 are two parallel rails 12 each provided on its upper face with an inverted T-slot 13. These rails are relatively long as shown in Fig. 1 so as to permit the several shiftable slides herein featured to be moved as a single unit in a direction, which in the illustrated case, happens to be from front to rear of the machine and thus to locate different parts of a large piece of work in juxtaposition to the grinding or other tool which is to operate on the designated part. This shiftable unit comprises a bottom slide 14, an intermediate slide 15, and a slide or table 16. Each of the two upper slides is mounted on the slide next therebelow so as to move in a direction at right angles to the slide therebelow. The unit as a whole is mounted to slide on the rails 12 and is designed to be locked in any position into which it may be set along the length of the rails. The unit is located in such roughly adjusted position by an eccentric locking device, more particularly shown in Fig. 7. This locking device includes a lock shaft 17 journalled in a depending flange 18 outlining the rear edge of the bottom slide 14 and journalled at its inner end in two depending feet 19 straddling one of the slots 13. The shaft 17 includes within the feet 19 an extension forming an eccentric pin 20 on which is loosely mounted an eccentric 21 the lower end of which terminates in a T-shaped head 22 located in the slot 13. The portion of the shaft which projects rearwardly beyond the flange 18 is provided with a handle 23 by means of which the shaft is rotated or rocked. From this construction it will be understood that with the handle 23 in one position, that is, lowered in either direction from the erect position shown in Fig. 7, the eccentric will be lowered so that its head 22 will be free to slide along the rail when the unit, including the bottom slide, is shifted as above outlined. Rotating the handle 23 into the erect position shown lifts the eccentric into the position shown in Fig. 7 and this will cause the head 22 to bear against the portion of the rail on opposite sides of its slot and which overlaps opposite edges of the head portion of the slot thus locking the bottom slide in its shifted position along the two rails.

The intermediate or longitudinal slide 15 is fitted between the rear flange 18 and a front flange 24 for movement in a direction transversely of the length of the rails. Relative movement between the bottom slide and the intermediate slide is controlled by means of a gear and rack feed 25 which includes a rack 26 secured to the rear side of the intermediate sill as shown in Fig. 6 in meshed engagement with gear 27, secured to shaft rod 28, journalled in the rear flange 18 and which shaft rod is in rotatable driving connection with a long shaft 29 through key 30 engaging in key slot 31 formed in the rod 28. The long shaft 29 extends from rear to front of the machine as shown in Fig. 1 and terminates at its front end in a spoke wheel 32, the spokes of which form long lever elements.

For the purpose of providing a bearing for the shaft 29 adjacent its hand manipulated end, a front bearing 33 is provided and which includes a pair of arms 34 and 35 slidably mounted on the rails 12 so that this out bearing may be shifted with the shifting of the unit comprising the several slides. The bearing 33 is locked in its adjustable position by means of a clamping screw 36 actuated by screw lever 37. From this construction it is appreciated that by rotating the spoke wheel 32 in one or the other direction the intermediate slide and with it the table 16 is moved as a unit to the right or to the left of the position shown in Fig. 1.

Figure 3:
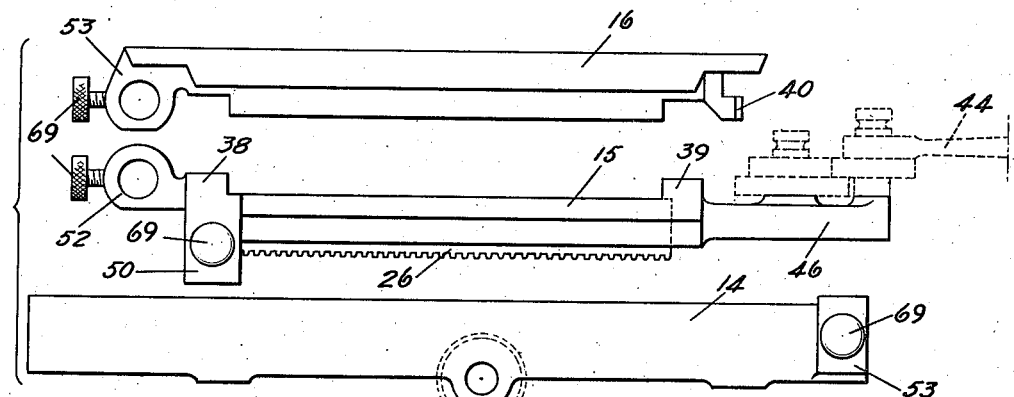
Fig. 3 is an exploded view showing the sliding members of Fig. 2 separated vertically from each other.

The top slide or table 16 is guided for movement transversely of the direction of movement of the intermediate slide between guiding shoulders 38 and 39 and the table is provided along one edge with a rack 40. This rack meshes with the larger gear 41 of a multiplying gear train, the smaller gear 42 of which meshes with a segmental rack 43 formed at one end of a lever 44 to form a table control. The gears 41 and 42 are integral and are rotatably mounted upon a stub shaft 45 extending upwardly from a plate 46 forming an extension from the right hand side of the intermediate slide as more particularly shown in Fig. 3. The lever 44 with its associated rack 43 is mounted upon an upstanding stub shaft 47 formed at the outer end of the extension plate 46.

As noted in the showing in Fig. 1, the lever 44 extends outwardly to the right of and beyond the bed so as to be conveniently accessible to the right hand of an operator standing in front of the machine and in position to operate the spoke wheel 32 with his left hand. It is understood that by manipulating the lever 44 clockwise or anticlockwise from the position shown in Fig. 1, the table is shifted relative to the intermediate slide upwardly or downwardly from the position shown in Fig. 1.

By means of these two table shifting mechanisms it is possible by the manipulation of the leverage devices provided by the wheel 32 and lever 44 to obtain what might be regarded as a rough adjustment of the table and with it the work carried thereby in two directions at right angles to each other relative to the bottom slide which when secured in position engaging the rails may be regarded as a stationary slide for the time being.

Figure 5:
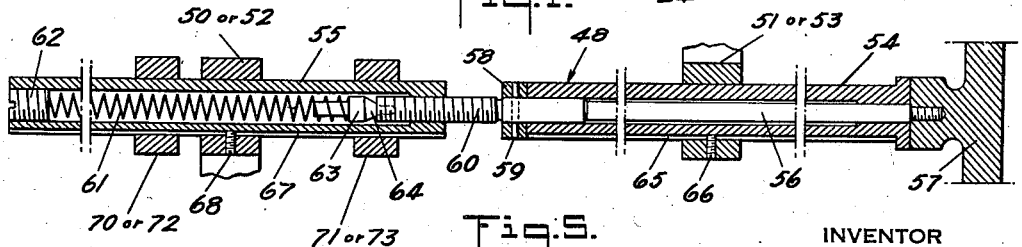
Fig. 5 is an enlarged detail sectional view taken axially through the control assembly and taken on either of the two lines 5—5 of Fig. 1.

In addition to the means thus provided for a quick setting of the table in position or to move the table roughly, a control assembly 48 is provided for two purposes: first, to provide a mounting for a pair of adjustable stops arranged to limit the gross movement between the bottom and intermediate slides and, second, to provide for a refined or micromical movement of these two slides. Similarly, there is provided a control assembly 49 for mounting the stops and for providing for micromical shifting of the upper slide or table relative to the intermediate slide. The control assembly 48 is passed through an extension 51 from the bottom slide and through extension 50 from the intermediate slide. Similarly, control assembly 49 is passed through extension 52 from the intermediate slide and extension 53 from the top slide or table. As these two control assembles are identical in construction, the detailed description of either one as by reference to the showing in Fig. 5 will be sufficient for the other.

The control assembly includes a spindle 54 and a spring chamber 55 disposed in axial alignment and coacting to form a two-part control shaft. A screw rod 56 is rotatably mounted in the spindle and fixed against longitudinal movement therein by a hand wheel 57 at one end in threaded engagement with the rod and a collar 58 at the opposite end secured to the screw rod by transverse pin 59. The screw rod projects beyond the collar engaged end of the spindle and terminates in a threaded end 60 which is intruded into and is in screw threaded engagement with the adjacent end of the spring chamber 55. By means of this construction, it will be understood that rotating the hand wheel 57 will cause the two parts of the shaft to approach or recede from each other thus causing the associated slides to similarly approach or recede from each other when secured to the spindle and spring chamber as hereinafter suggested.

For the purpose of taking up back lash between the threaded end 60 of the spindle and the part of the shaft comprising the spring chamber a compression spring 61 is contained within the chamber, bears at one end against an adjustable screw plug 62 and at the end adjacent the spindle bears against a spring guide 63 loosely journalled in the adjacent end 60 through a swivel connection 64. The control shaft thus formed by the spindle and spring chamber is arranged in axially shiftable but non-rotatable relation with its respective extensions 50—53 from the several slides. For instance, the spindle 54 of control assembly 48 is passed through extension 51 and the spring chamber 55 of control assembly 48 is passed through extension 50. Similarly, the spindle and spring chamber of control assembly 49 is passed respectively through extensions 53 and 52. As particularly shown in Fig. 5, the spindle 54 is provided with a longitudinal slot 65 in which is engaged a key screw 66 passed through the extension 51 or 53 as the case may be and engaging in the slot 65. Similarly the spring chamber 55 is provided with a slot 67 in which is engaged a key screw 68 passed through extension 50 or 52 as the case may be. Each of the extensions 50 to 53 is provided with a binding screw 69 by means of which the extension carrying the same is secured axially against relative movement with the associated spindle or spring carriage and in this way one or both of the associated pairs of slides may be secured to the control assembly.

From this construction it is understood that by locking one of the slides such, for instance, as the intermediate slide to the spring chamber as by tightening screw 69 which is on the extension 50, and locking the bottom slide to the companion spindle as by tightening the screw 69 which is on extension 51, then by manipulating the associated hand wheel 57, as shown at the right of Fig. 1, the intermediate slide 15 is shifted to the right or left relative to the bottom slide which for the time being is fixed in position on the rails. In this way a refined adjustment of these two slides can be made and which refinement will, of course, depend upon the pitch of the thread along the threaded end 60. Similarly, by securing the intermediate slide and table to the two parts of the control assembly 49 and manipulating the associated hand wheel, shown at the left of Fig. 1, the table 16 can be shifted relative to the intermediate slide which for the time being is regarded as a stationary element. In this way by the manipulation of the two hand wheels 57 at opposite sides of the table a refined adjustment or feeding of the work carried by the table is provided in two directions at right angles to each other and in the horizontal plane set by elevating mechanism forming no part of the present disclosure.

Figure 4:
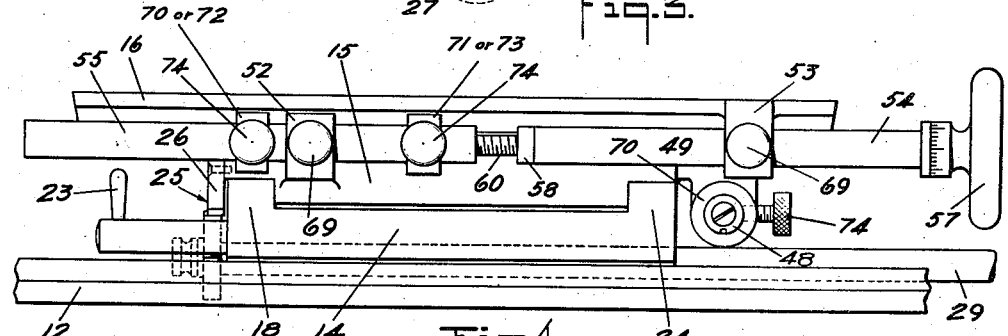
Fig. 4 is a view in side elevation looking at the construction from the left hand side of Fig. 1.

It is also suggested that the control assemblies 48 and 49 be utilized as supports for two sets of adjustable stops, each arranged for limiting the extent of permissible movement of their associated pair of slides and to set the location of this movement when the several slides are under control of the gross or rough manual shifting. For this purpose control assembly 48 is provided with a pair of stops 70 and 71 and control assembly 49 is similarly provided with a pair of stops 72 and 73. These stops are simply collars mounted in pairs on the spring chamber as shown in Fig. 4 and in each case secured in longitudinally adjusted position thereon by binding screws 74. These stops are located on opposite sides of the extensions 50 to 53 which they are intended to limit as, for instance, as by reference to Fig. 4, the extension 50 or 52 is located between the adjustable stops 70 or 72 on the left side and 71 or 73 on the right side.

In operation and assuming that the table as a whole has been shifted into approximate desired position and locked in its engagement with the rail by tightening clamp 36 and eccentrics 23, then by moving the adjustable stops 70 to 73 to the ends of their associated spring chambers and with their binding screws 68 and 74 loose, the control assembly as a whole may be shifted longitudinally into that position in which it will operate best to provide the desired control during the subsequent gross and refined shifting of the several slides. Then, by binding one of the extensions, such as 51, to the spindle, the adjustable stops 70 and 71 are advanced towards each other and into whatever position may be desired to control the movement of the associated slide. When so set the slide under consideration may be shifted within the limits of movement defined by the stops so located. Then, by securing to the associated spring housing the heretofore shiftable slide, in this case by securing extension 50 to the control assembly, this slide is locked to the spring housing and by manipulating the micromical feed by turning wheel 57 a refined relative movement between the associated slides is provided as hereinbefore outlined. Thus by a proper manipulation of the gross and refined feeding of the several slides while utilizing the different stops, it is possible to feed the work relative to the grinding tool either in a quick manual shift under control of the leverage devices herein disclosed, or to feed the work to the tool in a slow and more accurate manner and over areas which can be refinely limited.

By securing the two screws 69 of any pair of slides they are locked in their adjusted position by means of the assembly 48 or 49 as the case may be, due to the fine or low pitch threads at 60. While thus locked against accidental relative movement the connection permits of a slight adjustment by the rotation of the associated end wheel as above recited.

The top of the table is provided with transversely intersecting grooves 75 designed to receive a rotatable work carrying head forming no part of this disclosure.

While there have been shown, described and pointed out in the annexed claims, certain novel features of the invention, it will be understood that various omissions, substitutions and changes in the form and details of the device illustrated and in its operation may be made by those skilled in the art without departing from the spirit of the invention.

I claim:

1. In an adjustable work-supporting bed for grinding machines and the like, the combination in superposed order of a bed plate, a pair of rails mounted on the bed plate, a bottom slide adjustable on the rails lengthwise thereof, means for locking the slide in its adjusted position on the rails, an intermediate slide guided on the bottom slide for movement in a direction at right angles to the movement of the bottom slide on the rails, adjustable stops for limiting the permissible relative movement between the bottom and intermediate slides, two independent and manually actuated control means, both operating between the bottom and intermediate slides for causing relative movement therebetween within the limits defined by their associated adjustable stops, one of said means organized to cause a relatively quick, gross movement and the other including a screw feed and organized to cause a relatively slow, micromical movement, a table guided on the intermediate slide for movement in a direction at right angles to the movement of the intermediate slide, adjustable stops for limiting the permissible relative movement between the intermediate slide and the table, and two independent manually actuated control means both operating between the intermediate slide and the table for causing relative movement therebetween within the limits defined by their associated adjustable stops, one of said means organized to cause a relatively quick, gross movement and the other including a screw feed and organized to cause a relatively slow, micrometrical movement.

2. In an adjustable bed for grinding machines and the like, the combination of two superposed slidable members, guided for relative movement in one direction in a horizontal plane, a pair of adjustable stops for limiting the permissible relative movement between the members, two independent and manually actuated means each adapted to react between the said two superposed slidable members to cause such relative movement, one of said means including a leverage device capable of providing for a quick coarse movement between the members and the other including a screw feed capable of providing for a relatively slow refined movement between the members and means for locking said two slidable members as an adjustable unit in place on the machine.

3. In an adjustable bed for grinding machines and the like, the combination of two superposed slidable members, guided for relative movement in one direction in a horizontal plane, a pair of adjustable stops for limiting the permissible relative movement between the members, two independent and manually actuated means each adapted to react between the members to cause such relative movement, one of said members including a long leverage device capable of providing for a quick coarse movement between the members and the other including a screw feed for supporting said pair of adjustable stops and capable of providing for a relatively slow refined movement between the members.

4. In an adjustable work supporting bed, the combination of a pair of parallel rails, a slide guided for movement in one horizontal direction on the rails, means for locking the slide in its adjustably located position on the rails, a second slide guided on the first named slide for movement at right angles to the length of the rails, manually actuated mechanism for shifting the second slide on the first slide, said mechanism including a shaft, a bearing for the shaft slidably mounted on the rails and shiftable relative to both slides and means for securing the bearing in its adjusted position on the rails.

5. In an adjustable work-supporting bed, the combination of two members mounted for relative movement, mechanism for causing such movement, including a screw feed for reacting between the members, said feed including two axially shiftable elements, one for each member, each element being rotatably fixed, normally axially free to move relative to its associated member and in screw threaded engagement with the other and locking means associated with each element to secure it in an axially fixed position relative to its associated member.

6. In a device of the class described, the combination of two members adapted to be shifted one on the other, a control assembly comprising a spindle and spring chamber disposed in axial alignment and coacting to form a shaft, a screw rod mounted for rotary movement, fixed from axial movement in the spindle and in screw-threaded engagement with the spring chamber, the spindle extending through and keyed to one of the members and the spring chamber extending through and keyed to the other member, means for securing the spindle to its associated member, means for securing the spring chamber to its associated member, a compression spring contained in the spring chamber, a spring guide between the screw rod and the adjacent end of the spring and a screw plug forming an adjustable stop for the other end of the spring.

7. In a device of the class described, the combination with two members slidably mounted for relative movement in one direction and each provided with an extension, manually actuated screw means for causing said movement, said means comprising a two-part control shaft with the two parts in axial alignment and with one of the parts extending in axially free and rotatably fixed relation through one of the extensions, the other part similarly extending through the other extension, a pair of locking means, one for each part for securing at will each part to its associated member and a screw rod mounted for rotary movement in one of the shaft parts and in screw-threaded engagement with the other shaft part whereby when each shaft part is secured to the extension of its associated member, a rotation of the screw rod will cause relative movement between the two members, a pair of stops located loosely on one of the shaft parts on opposite sides of its associated extension and each stop provided with means for locking it in its adjusted position on the shaft part which carries it.

8. In a device of the class described, the combination of two members, manually actuated means for moving one member relative to the other, adjustable means for limiting said relative movement, said means including a two-part shaft with the parts disposed in axial alignment, manually actuated means for adjusting the two parts relative to each other, means for selectively securing one of the parts to one of the members and for securing the other part to the other member, a pair of stops adjustably mounted on one of the shaft parts, means for securing the stops in their adjusted positions, said stops being located to limit the movement of the associated member in its traverse in opposite directions.

9. In a device of the class described, the combination of two members, mechanism for moving one of the members relative to the other, said mechanism including a control shaft including two parts in axial alignment with one part extending through one of the two members and the other part extending through the other of the two members, means for securing at will each part to its associated member, a screw rod mounted in one of the parts for rotary movement and axially fixed relative thereto, said rod being in threaded engagement with the other shaft part whereby a rotation of the spindle will cause relative movement between the two parts of the shaft, and a spring contained in the other shaft part, bearing at one end against the same and bearing at its other end against the threaded end of the screw rod to maintain the threaded parts in snug threaded engagement.

10. In a device of the class described, the combination of two members mounted for relative movement in one direction, manually actuated means for causing such movement, a control assembly including a pair of adjustable stops for limiting the movement when so manually actuated, and a second manually actuated means for causing such movement, said second means including an element adapted to be secured to one of the members, another element adapted to be secured to the other member, manually actuated screw means between the elements for moving them axially relative to each other, and one of said elements providing a mounting along which the stops are adjustably supported.

11. In a device of the class described, the combination of two members mounted for relative movement and each provided with an extension, a control assembly including a two-part shaft, with one part extending in axially free and rotatably fixed relation through one of the extensions and the other part extending similarly through the other, means for adjusting the two parts axially relative to each other, means for selectively securing either one of the shaft parts to its associated extensions, a pair of stops loose on one of the parts and disposed on opposite sides of the associated extensions and means for securing each stop in its adjusted position in its associated shaft part.

12. In an adjustable work-supporting bed, the combination of two members mounted for relative movement, manually actuated mechanism for causing such movement, adjustable stops for limiting the extent of such movement, screw feed means for additionally causing such relative movement, means for selectively securing said screw feed means to one or both of said members and means for securing the stops to the screw feed means.

13. In a work supporting bed, the combination of two superposed slidable members, one guided on the other for relative movement, manually actuated control mechanism for causing said relative movement, said mechanism comprising a two-part drive shaft with the parts in axial alignment and operatively connected to drive one from the other and capable of a limited relative axial movement, one of said parts journalled in the lower member and the other part journalled in the upper member, said lower member provided with a gear wheel and the upper member provided with a rack meshing with the gear for shifting the members relative to each other when disconnected from and thus independent of said control mechanism.

14. In an adjustable work table, the combination of a plurality of slides including more than two, each mounted for longitudinal movement at right angles to the direction of movement of the slide therebelow, manually actuated means for shifting each of the slides, except the lowermost, relative to the next adjacent slide therebelow, one of said slides provided with a stop engaging part and a pair of adjustable stops located in opposite sides of said part and shiftable relative to each other in a direction parallel to the direction of movement of said slide for limiting the extent of possible movement of the same and for setting the location in space of said permissible movement so limited by the stops.

15. In an adjustable work supporting bed, the combination of two slides, with the upper slide guided for longitudinal movement on the lower slide, two independent means for shifting the upper slide on the lower slide, one of said means including a lever and organized to provide for a quick, coarse shifting and the other including a screw feed organized to provide for a more refined shifting and control means for selectively setting the last named means into an inoperative position to permit the actuation of the first named means and into an operative connection between the slides to permit it to function, and control stops for limiting the permissible movement of the upper slide relative to the lower slide when under control of the first named shifting means.

16. In an adjustable work supporting bed, the combination of two slides, an upper slide and a lower slide, the upper slide guided for movement on the lower slide, two independent means for shifting the upper slide on the lower slide, one of said means including a lever and organized to provide for a quick, coarse shifting and the other including a screw feed organized to provide for a more refined shifting and control means for selectively setting the screw feed means into an inoperative position to permit the actuation of the first named means and into an operative connection between the slides to permit it to function.

17. In an adjustable work bed, the combination of two slides mounted for relative movement, manually actuated means for shifting the slides and locking means having an operative and an inoperative position and when in its operative position operating between the said two slides for securing them in their shifted relation, said locking means including a threaded connection between the slides, having threads of low pitch acting to resist accidental movement of the slides from their locked position and capable when the threaded connection is rotated to vary the relative locked position of the slides.

18. In a machine provided with a base, the combination of a pair of relatively movable bed plates carried by the base, adjustable stops for locating on the machine base the permissible limits of such relative movement of the plates and two independent manually actuated control means for effecting the relative movement of the plates within the limits set by said adjustable stops, one of said means including lever mechanism for effecting a gross relative movement of the plates and the other including screw mechanism for effecting a micromical relative movement of the plates and said stops carried by and adapted to be secured at will to the screw mechanism to move therewith.

19. In an adjustable bed for grinding machines and the like, the combination of two superposed slidable members, guided for relative movement in one direction in a horizontal plane, two independent and manually actuated means each adapted to react between the said two superposed slidable members to cause such relative movement, one of said means including a leverage device capable of providing for a quick coarse movement between the members and the other including a screw feed capable of providing for a relatively slow refined movement between the members and means for locking said two slidable members as an adjustable unit in place on the machine.

CARL J. HERTLEIN.